United States Patent Office 2,983,858
Patented May 9, 1961

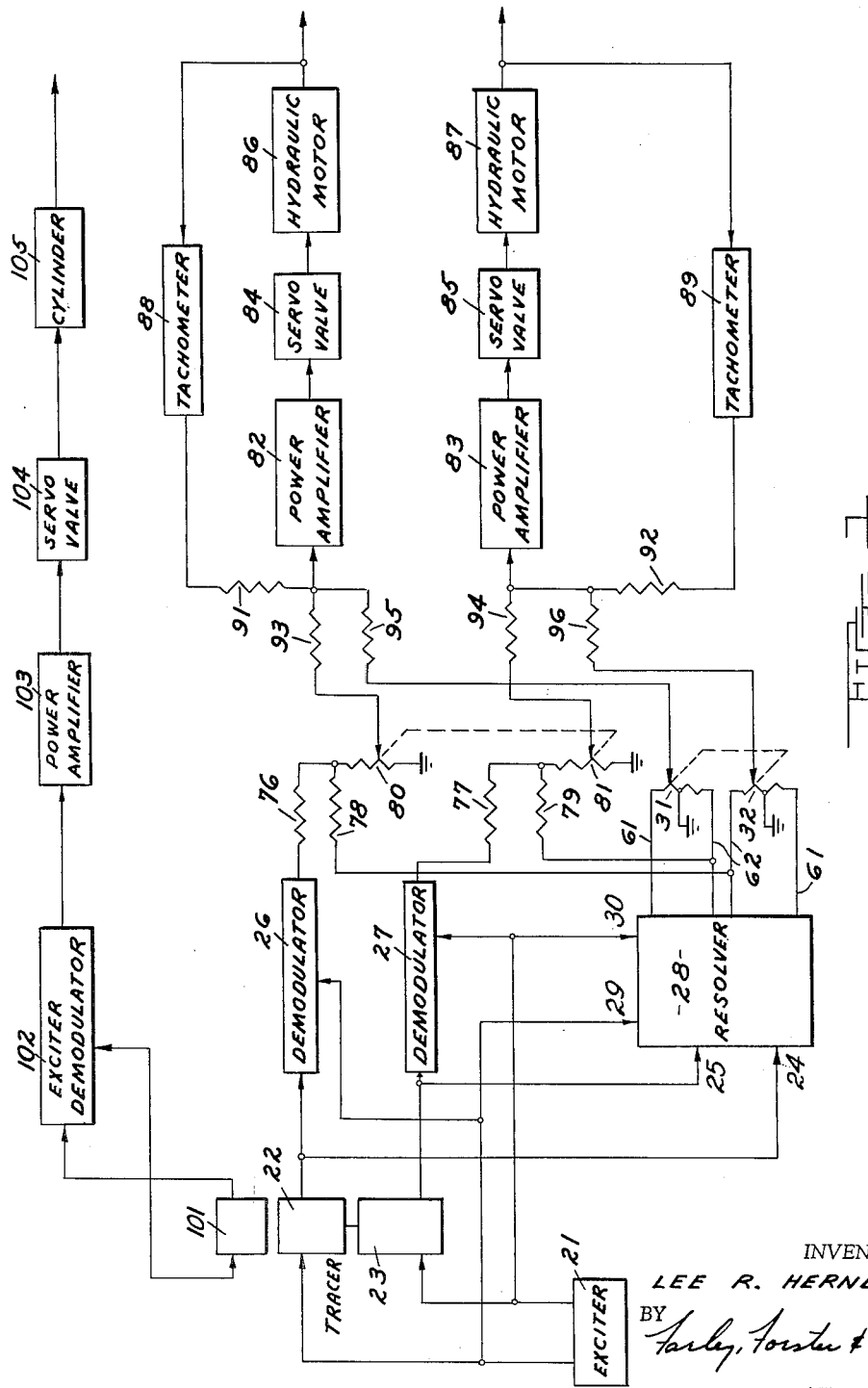

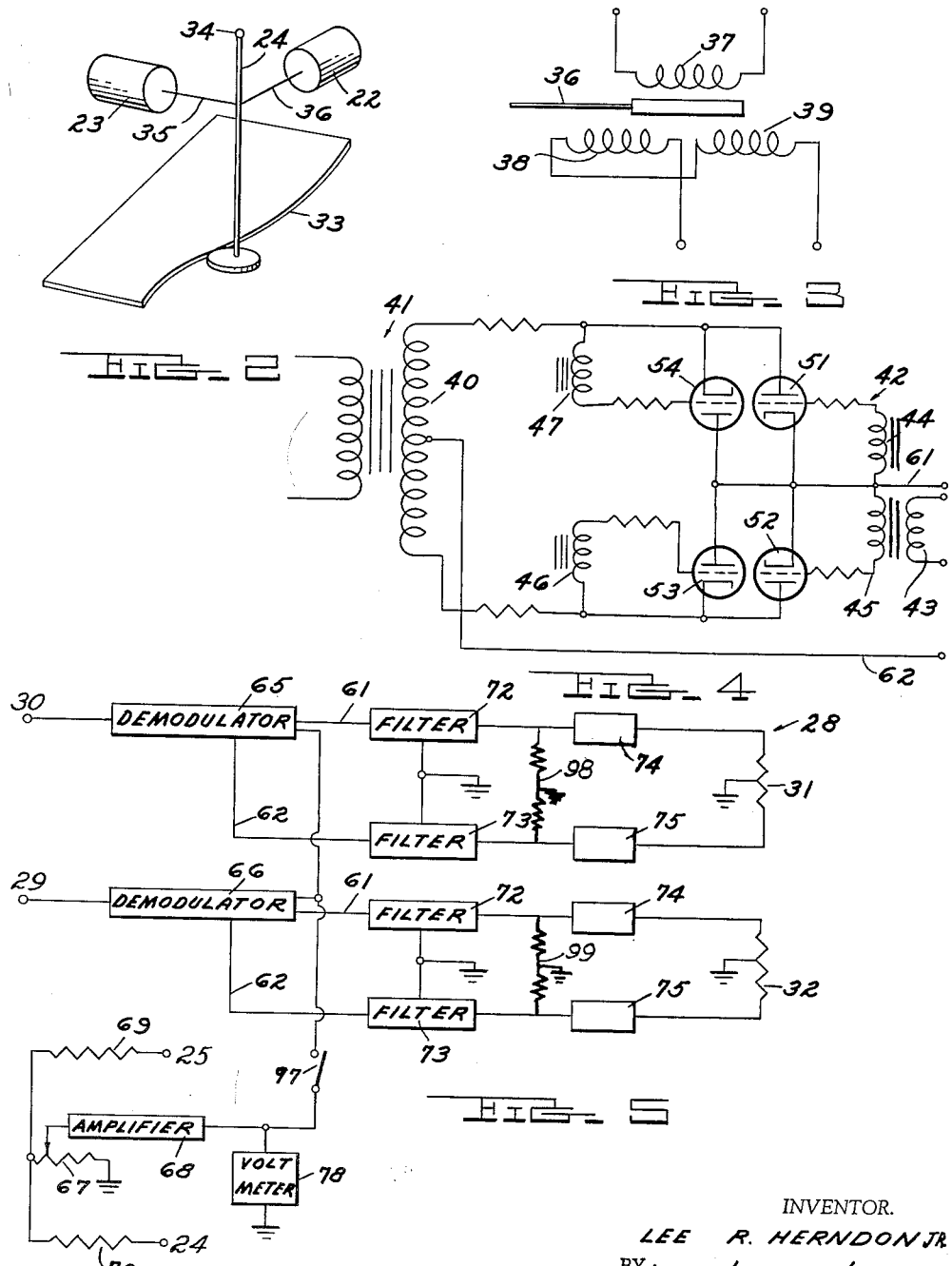

2,983,858

PATTERN TRACER CONTROL SERVOSYSTEM

Lee R. Herndon, Jr., Oak Park, Mich., assignor to Pegasus Laboratories, Inc., Berkley, Mich., a corporation of Michigan Filed July 2, 1957, Ser. No. 669,626

10 Claims. (Cl. 318—162)

This invention pertains to a tracing mechanism and more particularly to a device which has a stylus or probe pivoted in fixed relation to the axis of a cutting tool. The stylus automatically contacts a template which is fixed to a workpiece table and maintains contact at a constant deflection with said template thereby guiding the cutting tool or, as in the embodiment described below, the workpiece table, so as to form a piece identical with the template.

This invention utilizes an electrical circuit to move the cutting tool relative to the workpiece table in a direction normal to the deflection of a deflected probe with corrections made to the table, in the opposite direction of the error which is detected by the difference between the actual probe deflection and a given constant reference deflection. If such a difference exists, an electrical signal is sent to a power means which changes the direction of the table movement until the probe deflection and the reference deflection are equal.

In this embodiment, the probe is connected to two perpendicularly aligned differential transformers which may be called $x$ and $y$ transformers so that movement of the probe will move one or both of the transformer cores altering their output in a linear proportion. Likewise the error signal is resolved into signals for perpendicularly aligned power sources for moving the table.

A distinguishing feature of this invention is the means for establishing, transforming, and comparing the probe signal with a reference signal. The differential transformer connected to the tracer probe has a movable core which, when centered, balances the output of oppositely wound secondaries so that the voltage from one secondary will be equal to and opposed the voltage from the other secondary portion. Movement of the core will result in an output of one sign for movement in one direction and of an opposite sign for movement in an opposite direction. The excitation for the $y$ transformer is 90° out of phase with that for the $x$ transformer. This probe output or probe deflection voltage is then fed to a demodulator which is a phase splitting device for reversing every 180° the wave form of a sinusoidal input resulting in a D.C. voltage corresponding to the probe deflection and core position. The signal or exciter voltage used to excite the probe transformers is used to demodulate the probe output in the phase splitting circuit. The demodulated signal is compared with a reference signal which is obtained in a similar phase splitting circuit in which the sum of the $x$ and $y$ probe signals is used to demodulate each of the $x$ and $y$ exciter signals which results in wave forms each having an amplitude dependent on a direction of the probe deflection instead of the amount or degree of the probe deflection. By using the sum of the $x$ and $y$ probe voltages to demodulate each exciter voltage, each exciter voltage will be split or reversed at the point where the $x$, $y$ voltage curve changes direction. The point at which the $x$, $y$ voltage curve changes direction will vary depending on the value of $x$ relative to $y$ since the $x$ and $y$ voltages are 90° out of phase, and this will cause the $x$ and/or $y$ exciter voltages to be cut off or reversed twice each cycle with reversal point dependent on the relative $xy$ values so that the D.C. amplitude will vary according to direction of probe deflection.

Other features of the invention will become more apparent when explained in connection with the drawings in which:

Figure 1 is a schematic circuit diagram of the control mechanism of this invention;

Figure 2 is a schematic pictorial view of a probe and two differential transformers;

Figure 3 is a wiring schematic of a single differential transformer;

Figure 4 is a wiring diagram of a demodulator; and

Figure 5 is a schematic wiring diagram of the resolver.

In Figure 1 is shown in schematic of the control system of this invention wherein sinusoidal exciter voltages are generated at 21 with one voltage differing from another by 90° in phase. These two voltages differing in phase by 90° are sent respectively to $x$ and $y$ differential transformers 22, 23 with each of these transformers having a movable core connected to a tracer probe 24 shown in Figure 2. These transformers are connected respectively to $x$ and $y$ demodulators 26, 27 feeding each demodulator a deflection signal modified by the core and probe position. As shown, the exciter signal for transformer 22 is delivered to demodulator 26 and resolver 28, while the exciter signal for transformer 23 is delivered to demodulator 27 and resolver 28. Modified or deflection signals from transformer 22 and 23 are also fed to resolver 28 which vectorially combines the two signals and uses this vectorial combination to demodulate the $y$ exciter voltage and the $x$ exciter voltage with these demodulated signals shown respectively across the resistances 31, 32.

Looking momentarily at Figure 2 is seen template 33 which in this embodiment is fastened to a milling machine table and moves with the table so that probe 24 has a normal deflection of constant magnitude. The workpiece, not shown, is also connected to the moving table while probe pivot 34 and the cutting tool, not shown, remain in fixed relation to one another and to the milling machine frame. Of course, the probe and cutter could be moved while the template or pattern and the workpiece were stationary. In this device, the template is moved with a tangential velocity to probe 24.

As seen in Figure 2, there is connection between probe 24 and each of the cores of transformers 22, 23 so that a movement of probe 24 about pivot 34 will move one or both of the cores. In Figure 3 a schematic diagram of a single transformer is shown with movable core 36 primary winding 37 and secondary windings 38, 39. As shown the secondary windings oppose one another so that with a centered core the output across the secondary terminals will be zero. However, if the core is moved to the right or left, there will be an output across the secondary.

Shown in Figure 4 is a wiring diagram of a demodulator two of which are located in the resolver of Figure 5 and two of which are located at 26, 27 in the diagram of Figure 1. The operation of these demodulators is similar in nature as is their construction with the exception that the demodulators 65, 66 of the resolver 28 each provide two output voltages of opposite polarity. Transformer 42 has primary winding 43 and secondary windings 44, 45, 46 and 47, each of which is connected in series with a resistance between the grids and cathodes of triodes 51, 52, 53 and 54, respectively. It is seen that with a wave form of one direction induced into the secondary winding which makes the grid end of winding 44 more positive than that of 45, tubes 51 and 54 will fire since their grids are respectively positive relative to their cathodes. A wave form induced in an opposite direction will cause tubes 52 and 53 to fire. With tubes 51 and 54 firing, the signal induced in the upper half of secondary 40 of a transformer 41 will have one conformation which will be coupled between line 61 and line 62, while if tubes 52 and 53 fire, the inverted signal from the bottom half of secondary 40 will be coupled between lines 61 and 62. Therefore, by reversing the direction of the current in primary 43 the wave form selected from secondary 40 can be inverted, with this wave form appearing in line 61, and line 62. As shown in a resolver diagram Fig. 5, the voltage between lines 61 and 62 is filtered to obtain the average D.C. component.

The resolver 28 is shown schematically in Figure 5. $x$ and $y$ exciter signals appear at the primaries of transformers 41 of demodulators 65, 66. The modified exciter or deflection signals from the probe transformers 22, 23 are combined at potentiometer 67 which is tapped into amplifier 68 which amplifies the sum of the wave forms appearing at 69, 70 and applies this sum to the primaries of transformers 42 of demodulators 65, 66. Switch 97 is provided and if opened, breaks the circuit to the primaries of transformers 41 causing the probe, and cutting tool, to break contact with the template and workpiece. This is advantageous since the work may be stopped at any point in the cycle. The output or demodulated signals in lines 61, 62 are converted to their average D.C. values by being fed respectively through compensating filters 72, 73 to center tapped grounded resistors 98, 99 and then to the grids of cathode follower circuits 74, 75 with the outputs in lines 61, 62 appearing across opposite ends of center tapped resistances 31, 32 for the $y$ and $x$ coordinates, respectively, as shown in Figure 1.

These two resolver outputs are reference voltages and have a dual function. Their negative values are reference deflection signals which appear for the $x$ coordinate at resistance 78 and for the $y$ coordinate at resistance 79. The positive value of one output and the negative value of the other output, when applied to the control of the table drive for the other coordinate, are feed signals which control the relative rate of movement between the probe and template, and hence, between the tool and the work, in a direction always normal to the direction of probe deflection. Accordingly, the positive value of the $y$ resolver output, at resistance 31, is supplied to resistance 95 in the control system for the $x$ coordinate drive; and, the negative value of the $x$ resolver output from resistance 32 is supplied to resistance 96 in the $y$ coordinate control system.

Resistances 31 and 32 form part of a gang potentiometer, as shown in Figure 1, so that the feed signals, and hence the feed rate, can be easily varied from zero to maximum.

Looking again at Figure 1 it is seen that the outputs or actual deflection signals of $x$ and $y$ demodulators 26, 27 appear respectively across resistances 76, 77 which resistances are connected respectively to resistances 78, 79 across which appear the $x$ and $y$ reference deflection signals. The sum of the plus voltage across resistor 76 and the minus voltage across resistor 78 is the $x$ deflection error voltage. Likewise, the sum of the plus voltage across resistor 77 and the minus voltage across resistor 79 is the $y$ deflection error voltage.

These $x$ and $y$ deflection error voltages are respectively passed through resistances 80 and 81 and appear at resistance 93 for the $x$ coordinate control system and resistance 94 for the $y$ coordinate control system, these systems respectively including amplifiers 82, 83 which regulate the servo valves 84, 85 and hydraulic motors 86, 87. Tachometers 88, 89 record respectively the speed of the milling table in the $x$ and $y$ directions. These speeds each reflect the sum of the rate of feed and any error on each coordinate and hence the tachometer outputs indicate these sums as $x$ and $y$ negative feedback potentials across resistances 91 and 92 respectively.

As a result, each coordinate drive means is actuated in response to the sum of the error signal, the feed signal and the negative feedback potential. If desired a third transformer 101 may be placed in a plane perpendicular to the plane formed by the transformers 22, 23 and connected to an exciter demodulator 102 and in turn to amplifier 103, servo valve 104, and cylinder 105 which operates the milling head to provide a three dimensional automatically controlled unit.

*Operation*

Representative wave forms for the various voltages developed and employed in the control system are shown in Fig. 6, illustrating a normal condition in which the probe deflection is equal to the reference deflection. The probe is always deflected along a line substantially normal to the line of tangency at the contact point between the probe 24 and the template 33, and the reference deflection, in direction and amount, is employed to obtain a normal feed signal for driving the machine table in a direction 90° to the direction of deflection.

Referring to Fig. 6 and to the overall circuit diagram, Fig. 1, the excitor 21 supplies a sinusoidol $x$-excitation voltage 110 to the transformer 22 and a sinusoidol $y$-excitation voltage 112 to the transformer 23, the $y$-excitation being 90° out of phase with the $x$-excitation. $x$ and $y$ probe output voltages 114 and 116 are developed by the transformers 22 and 23 depending upon the position of their respective cores as determined by the position of the probe 24. The probe output voltages 114 and 116 illustrated in Fig. 6 represent an instantaneous condition, it being understood that these voltages will each vary with probe position as the probe moves around the template.

These $x$ and $y$ probe output voltages are respectively fed to the terminals 24 and 25 of the resolver 28. Referring to Fig. 5, the vectorial sum of the $x$ and $y$ probe output voltages appears across resistance 67 and is illustrated by the representative wave form 118 in Fig. 6. This wave form is displaced from the output voltage waves 114 and 116 by an angle $\theta$ which represents the direction of deflection of the probe center relative to the $x$ axis. Voltage 118 is squared to the form represented by the wave 120 in Fig. 6 in the amplifier 68 and is supplied to the input terminal 50 (Fig. 4) of each of the demodulators 65 and 66 of the resolver. The $x$ and $y$ excitation voltages 110 and 112 are supplied respectively to terminals 29 and 30 of the resolver demodulators (which correspond to the other demodulator input terminal 51) (Fig. 4), and these voltages are each demodulated by the voltage 120 to obtain an $x$-reference voltage 122 and a $y$-reference voltage 124. Each of these voltages 122 and 124 are filtered, as previously described, to obtain $x$ and $y$ D.C. reference voltages 123 and 125 respectively. These D.C. reference voltages appear at resistances 32 and 31 for the $x$ and $y$ coordinates respectively.

The $x$ probe output voltage 114 is supplied to demodulator 26 where it is demodulated by the $x$-excitation voltage 110 to give the wave form 126 which is filtered to obtain its average D.C. value 127, or $x$ probe deflection signal. This $x$ probe deflection signal appears at resistance 76. Similarly, the $y$ probe output signal is demodulated and filtered to give the respective $y$ probe deflection voltages 128 and 129, with the D.C. voltage 129 appearing at resistance 77.

The negative value of the $x$ reference voltage 123 appears across resistance 78 and is confined with the $x$ probe deflection voltage 127 at resistance 80; the negative value of the $y$ reference voltage is combined with the $y$ probe deflection voltage at resistance 81. If the actual deflection as measured by the probe output voltages 114 and 116 is equal to the reference voltages, the net signal at the resistances 80 and 81 will be zero in each case, or in other words, any signal appearing at these resistances will indicate any difference between the actual probe deflection and the reference deflection.

The reference voltages 123 and 125 have values which reflect the angle of the probe deflection relative to the $x$ coordinate which angle is equal to the angle of feed less 90°. Consequently, when the positive value of one of these voltages is supplied to the table drive for the opposite coordinate as is the positive value of voltage 125 to resistance 95 for the $x$ coordinate drive, and the negative value of the other voltage supplied to the drive for the other coordinate as is the $x$ reference voltage 123 to resistance 96 for the $y$ coordinate drive, the result is to supply driving signals which reflect the feed angle. The value of these signals and hence the feed rate can be adjusted by the gang potentiometer 38. Feed can be interrupted by the switch 77 (Fig. 5) and the tool will move away from the work by the amount of the reference deflection.

The outputs of the $x$ and $y$ coordinate tachometers 88 and 89 are adjusted to values slightly less than these feed signals at resistances 95 and 96 and as a result a much better response is obtained from the system. A small degree of change in the tachometer signal will result in a large degree of change in the net input signal to either of the amplifiers 82 or 83. This tachometer feed-back loop will be recognized as a means of making an accurate variable speed drive for electric as well as the hydraulic driving components illustrated.

It will be appreciated by those skilled in the art that compensation can readily be applied to any of the D.C. signals in the control system. By means of such compensation the dynamic characteristics of the control system can readily be changed to adapt it for use with machines of different size, operating speeds, etc.

While preferred embodiments have been described above in detail, it will be understood that numerous modifications might be resorted to without departing from the scope of my invention as defined in the following claims.

I claim:

1. A system for controlling relative movement between a tracer probe and a template, including drive means operable along first and second angularly related lines of reference, comprising means for supplying a pair of A.C. excitation voltages differing in phase by the angle between said lines of reference, means operable by said probe for producing a pair of probe output signals from said excitation voltages, each of said A.C. probe output voltages being proportional to the magnitude of probe deflection along one of said lines of reference, means for converting each of said A.C. probe output signals to a D.C. probe deflection signal, means for obtaining the vectorial sum of said A.C. probe output signals, means for demodulating each of said excitation voltages with the said vectorial sum of said probe output signals to obtain a D.C. reference voltage for each of said lines of reference, means for combining each of said D.C. probe deflection signals with the negative value of the said D.C. reference voltage for the corresponding line of reference to obtain a pair of D.C. deflection error voltages, means for obtaining a D.C. feed voltage for each of said lines of reference from the said reference voltage for the other line of reference, one of said feed voltages being obtained from the negative value of the other reference voltage, means for actuating said drive means on each line of reference in response to the sum of said D.C. feed and error voltages for each line of reference, and means for comparing the sum of said feed and error voltages with a D.C. feedback voltage proportional to the velocity of said drive means.

2. A control system according to claim 1 further characterized by adjustable means for controlling the value of said feed signals whereby the rate of feed between said probe and said template can be varied.

3. A control system according to claim 1 further characterized by said means for demodulating each of said excitation voltages with the said vectorial sum of said probe output signals including circuit means for obtaining said reference voltages in positive and negative values.

4. A control system according to claim 3 wherein said circuit means further includes a compensating network for adjusting at least one of said positive and negative reference voltage values.

5. A control system according to claim 1 wherein said means for converting each of said probe outlet signals to a D.C. probe deflection signal includes an input voltage derived from the excitation voltage for the corresponding line of reference.

6. A system for controlling relative movement between a tracer probe and a template, including drive means operable along rectangular coordinates, comprising means for supplying a pair of excitation voltages having a relative phase angle of 90°, means operable by said probe for modifying each of said excitation voltages to produce a pair of probe output signals, each of said probe output signals being proportional to the magnitude of probe deflection along one of said coordinates, circuit means for each of said coordinates for converting each of said probe output signals to a uni-directional deflection signal, a resolver network, said resolver network including means for vectorially adding said probe output signals and circuit means for each of said coordinates for demodulating the corresponding exciter voltage for such coordinate with said vectorial sum to obtain a unidirectional reference voltage in the positive and negative value thereof, means for comparing the negative value of said reference voltage with the corresponding coordinate probe deflection signal to obtain an error voltage, circuit means for obtaining a feed signal for each coordinate from said reference voltages, said circuit means including a connection to the said positive value of the reference voltage for one coordinate and the said negative value of the reference voltage for the other coordinate, said feed signals being applied to the drive means for the coordinate opposite to the coordinate of the reference voltage from which they were derived, and means for obtaining a feedback voltage from each drive means and comparing such feedback voltage with the sum of the said error and feed signals for each coordinate.

7. In a system for controlling relative movement between a tracer probe and a template and including drive means operable along at least two angularly related lines of reference, means for obtaining signals proportional to the magnitude of probe deflection along said lines of reference, said deflection signals having a relative phase angle equal to the angle between said lines of reference, circuit means for obtaining a feed signal for each line of reference, said feed signal circuit means including means for obtaining the vectorial sum of said deflection signals, means for supplying input signals to said feed signal circuit means, each of said input signals having a phase corresponding to the phase of one of said deflection signals, means for modulating each of said input signals with the said vectorial sum of said deflection signals to obtain a uni-directional reference signal, means for applying each of said reference signals to the control means for the other line of reference as a feed signal and means for reversing the polarity of one of said feed signals.

8. Control circuit means according to claim 7 further characterized by means for selectively compensating said feed signals.

9. Control circuit means according to claim 7 further characterized by means for varying the amplitude of each of said feed signals.

10. Control circuit means according to claim 7 further characterized by said circuit means including means for obtaining said reference signals in positive and negative values and means for employing the said negative values thereof as reference deflection signals.

References Cited in the file of this patent

UNITED STATES PATENTS

| | | |
|---|---|---|
| 2,492,731 | Branson | Dec. 27, 1949 |
| 2,499,178 | Berry et al. | Feb. 28, 1950 |
| 2,511,956 | Wetzel | June 20, 1950 |
| 2,559,575 | Fryklund et al. | July 3, 1951 |
| 2,627,055 | Calosi | Jan. 27, 1953 |
| 2,632,872 | Warsher | Mar. 24, 1953 |
| 2,679,620 | Berry | May 25, 1954 |
| 2,774,928 | Johnson et al. | Dec. 18, 1956 |
| 2,837,707 | Stokes | June 3, 1958 |

OTHER REFERENCES

Hill, W. R.: Electronics in Engineering, McGraw-Hill, N.Y., 1949, pp. 246–47, Figs. 15.8–15.9.